US012770602B2

(12) United States Patent
Frick

(10) Patent No.: US 12,770,602 B2
(45) Date of Patent: Oct. 20, 2026

(54) METHOD FOR ELIMINATING ROOM MODES, AND DIGITAL SIGNAL PROCESSOR AND LOUDSPEAKER THEREFOR

(71) Applicant: ADAM Audio GmbH, Berlin (DE)

(72) Inventor: Christian Frick, Zurich (CH)

(73) Assignee: ADAM Audio GmbH, Berlin (DE)

( * ) Notice: Subject to any disclaimer, the term of this patent is extended or adjusted under 35 U.S.C. 154(b) by 215 days.

(21) Appl. No.: 18/711,447

(22) PCT Filed: Nov. 14, 2022

(86) PCT No.: PCT/EP2022/081803
§ 371 (c)(1),
(2) Date: Jun. 13, 2024

(87) PCT Pub. No.: WO2023/088842
PCT Pub. Date: May 25, 2023

(65) Prior Publication Data

US 2025/0037692 A1 Jan. 30, 2025

(30) Foreign Application Priority Data

Nov. 17, 2021 (CH) ................................ 70572/2021

(51) Int. Cl.
*G10K 11/178* (2006.01)
*H04R 29/00* (2006.01)
*H04S 7/00* (2006.01)

(52) U.S. Cl.
CPC .. *G10K 11/17817* (2018.01); *G10K 11/17815* (2018.01); *G10K 11/17881* (2018.01);
(Continued)

(58) Field of Classification Search
None
See application file for complete search history.

(56) References Cited

U.S. PATENT DOCUMENTS

2018/0268802 A1* 9/2018 Urhonen .............. G10K 11/002
2019/0132678 A1* 5/2019 Jain .................. G10K 11/17875

FOREIGN PATENT DOCUMENTS

EP 2 134 105 A1 12/2009
EP 2 357 847 A2 8/2011
(Continued)

OTHER PUBLICATIONS

International Search Report and Translation of Written Opinion for International Application No. PCT/EP2022/081803 dated Mar. 13, 2023.
(Continued)

*Primary Examiner* — Qin Zhu
(74) *Attorney, Agent, or Firm* — MORGAN, LEWIS & BOCKIUS LLP

(57) ABSTRACT

The invention relates to a method for eliminating room modes Ñ. The method consists substantially in using a digital signal processor (60) to generate and store a filter W*(z) in a two-stage characteristic measurement, which filter characterises and maps the sound changes of a user signal N emitted into a room (10) by a main loudspeaker (21), including the room modes Ñ generated in this way. The filter W*(z) generates a changed signal Ñ− from the digitally available user signal N, which is played by the main loudspeaker (21), to eliminate the room modes Ñ, which changed signal is played by a correction loudspeaker. The two signals cancel each other out in the room (10). Because passage through the filter W(z) requires a certain time dt, the original signal N remains completely audible in the room (10) and cannot be eliminated. The signal Ñ− can therefore eliminate only the portion of the soundwaves in the room (10) that is still present after this time dt. This ensures that the original signal N is audible in the room (10) completely and unchanged in comparison with the source, while the long-lasting room modes Ñ are eliminated after a short time
(Continued)

dt. The main and correction loudspeakers (21, 22) may be the same loudspeaker (23). The invention also relates to a digital signal processor (60) provided for this purpose and to a loudspeaker (21, 22, 23).

21 Claims, 3 Drawing Sheets

(52) U.S. Cl.
CPC .. *G10K 2210/12* (2013.01); *G10K 2210/3011* (2013.01); *G10K 2210/3026* (2013.01); *G10K 2210/3027* (2013.01); *G10K 2210/3028* (2013.01); *G10K 2210/3055* (2013.01)

(56) References Cited

FOREIGN PATENT DOCUMENTS

| | | | |
|---|---|---|---|
| EP | 3 445 069 | A1 | 2/2019 |
| FR | 2 965 685 | A1 | 4/2012 |
| WO | 02/090902 | A2 | 11/2002 |
| WO | 2007/028094 | A1 | 3/2007 |
| WO | 2017037341 | A1 | 3/2017 |

OTHER PUBLICATIONS

Elliott, S.J. et al., "Multiple-Point Equalization in a Room Using Adaptive Digital Filters", J. Audio Eng. Soc., vol. 37, No. 11, Nov. 1989. pp. 899-907.

* cited by examiner

METHOD FOR ELIMINATING ROOM MODES, AND DIGITAL SIGNAL PROCESSOR AND LOUDSPEAKER THEREFOR

CROSS-REFERENCE TO RELATED APPLICATIONS

The present Application is a 371 National Stage Entry of International Patent Application No. PCT/EP2022/081803 filed Nov. 14, 2022, which claims priority to Swiss Patent Application No. 070572/2021, entitled "Method for Eliminating Room Modes, and Digital Signal Processor and Loudspeaker Therefor", filed Nov. 17, 2021, each of which is hereby incorporated by reference in its entirety for all purposes.

TECHNICAL FIELD

The invention concerns a method for eliminating room modes that are created as resonances in a room when a user signal is played through a main loudspeaker.

TECHNICAL BACKGROUND

In every room, e.g. in recording studios, resonances form at certain frequencies, so-called room modes. In comparison to other sounds played at the same level, these are distorted in level and more persistent and are perceived as disturbing.

A room mode can form when a half wavelength of a tone or an integer multiple thereof corresponds exactly to the length, width or another important dimension of the room in which the tone is generated. For comparison, we can consider the excitation of a guitar string, in which root notes and overtones are formed. The frequencies of the disturbing room modes are in the bass range, with higher overtones being less pronounced.

The intention is that the original sounds of a played user signal are heard completely and correctly in all frequencies and then fade away as if the room were infinitely large. No sounds from the original signal should be suppressed, boosted or temporally altered. Sounds reflected from the walls of the room are permitted per se, except in the frequencies of the room modes.

Known solutions to this problem use a filter that equalises the volume of the sound output for problematic sounds according to the problem. However, these solutions change the original sound of the sound signal to be emitted, which is why they should be avoided.

In U.S. Pat. No. 10,490,180 or WO 2017/037341 A1, from first digital information that describes a system impulse response caused by a loudspeaker, second digital information is derived that describes a cancelling impulse response and is added attenuated and with a time delay. For this purpose, a delay value must be determined.

The disadvantage of this or any other method that determines a delay value is the limitation that the correction response generated in this way is only designed for a few specific room modes which can be eliminated. However, a large number of different room modes form in each room, for example in the longitudinal and transverse directions, in height, but also diagonally. Depending on the frequencies, different room modes are dominant in each case. Each room mode forms its impulse response with a different, unique delay time. The decisive factors are the type of room mode and the position of the loudspeaker and microphone. Naturally, only a small subset of all modes can be eliminated with a correction signal specified with a time delay.

In EP 2357847, a delay response that is to be equalised is assigned for a loudspeaker at a predefined position within a listening room. Filter coefficients are then calculated for all-pass filters that are arranged respectively upstream of this loudspeaker, wherein the all-pass filter has a transfer characteristic such that the corresponding delay response corresponds to a predefined target delay.

These solutions usually have the disadvantage that a precise time delay must be determined so that the Active Noise Cancelling/Control signal (ANC signal) is superimposed on the original signal in the correct phase position. In addition, the computing power is very high because the ANC signal must be calculated in a very short time and provided with high resolution in order to be able to output the correction signal in time.

DESCRIPTION OF THE INVENTION

The object of the present invention is therefore to describe a method which can play the complete original sound sequence of a specified item in a room and at the same time prevent the formation of the room modes in the room. This should preferably be possible with relatively low computing power so that timely correction of the original signal can take place using commercially available processors, such as those commonly used in consumer goods, for example.

Further tasks of the invention are to describe a digital signal processor (DSP) with which this method can be executed, as well as a loudspeaker that can fill the room with the user signal or with a correction signal, without room modes disturbing the acoustics in the room.

The tasks are solved by the claims in the corresponding categories. Advantageous methods and embodiments are described in the respective dependent claims.

The embodiments according to the invention are described in connection with the figures.

The solution of the invention essentially consists in the fact that in a two-stage characteristic value measurement, a filter $W^*(z)$ is generated and saved with the aid of a digital signal processor, this filter characterising and mapping the sound changes of a user signal N emitted by a main loudspeaker into a room, including the room modes $\tilde{N}$ generated in this way. From the available digital user signal N which is played by the main loudspeaker, the filter W generates a modified signal $\tilde{N}-$ to eliminate the room modes $\tilde{N}$, this signal being played by a correction loudspeaker. The two signals cancel each other out in the room. Since the passage through the filter W requires a certain time dt, the original signal N remains fully audible in the room and cannot be eliminated. The signal $\tilde{N}-$ can therefore only cancel out that portion of the sound waves in the room still present after this time dt. This ensures that the original signal N is fully audible in the room, while the persistent room modes $\tilde{N}$ are cancelled out after a short time dt. The main loudspeaker and the correction loudspeaker can be one and the same loudspeaker.

The user signal N must be present as a digital signal or be digitised from an analogue signal so that the method according to the invention can be carried out with it.

In the first stage of the characteristic value measurement, the acoustic characteristics of a digital signal A are reproduced and saved in an intermediate filter $S'^*(z)$ after that signal has been played by the correction loudspeaker in this room. For this purpose, the signal B is received and analysed at a microphone in the room.

In the second stage, a signal C is played into the room from both the main loudspeaker and the correction loudspeaker and is received by the microphone as signal D. In addition, a filter W(z) is generated which changes the signal C before it is sent to the correction loudspeaker. The filter W is now changed and adjusted until the sound at the microphone is cancelled out as much as possible. This is possible because the characteristics of the correction loudspeaker are already known as S'*(z). This filter is finally saved as W*(z) and used for the utilisation of the method.

BRIEF EXPLANATION OF THE FIGURES

The invention will be explained in more detail below in conjunction with the drawings. The figures show the following.

WAYS OF CARRYING OUT THE INVENTION

Figure 9:
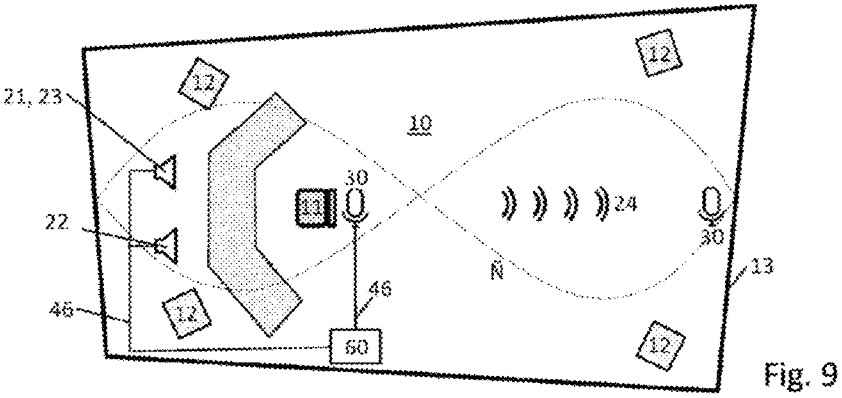
FIG. 9 shows a room set up to execute the method.

FIG. 9 shows a schematic representation of a room 10 in which the method according to the invention can be carried out, for example a recording studio. A concert hall or a living room can also serve as the room 10. As a recording studio, the walls 13 delimiting the room 10 generally do not have right-angled corners to one another, in order to prevent room modes as far as possible. The room 10 can be equipped with optional additional loudspeakers 12, which are of no significance or influence for the method according to the invention. In addition, furniture such as a mixing console and a seat 11 for a person, as well as computers and monitors of any kind, can be arranged in this room 10. A typical size for such a room 10 is 10-100 $m^2$, wherein the method can also be used effectively in larger and smaller rooms 10.

For the method according to the invention, a main loudspeaker 21 and a correction loudspeaker 22 must be arranged in the room 10, wherein these can be designed as separate loudspeakers or, alternatively, as a common loudspeaker 23. In addition, a microphone 30 must be arranged in the room, with the loudspeaker or loudspeakers 21, 22, 23 and the microphone 30 being connected with appropriate sound electronics to a digital signal processor 60.

Figure 10:
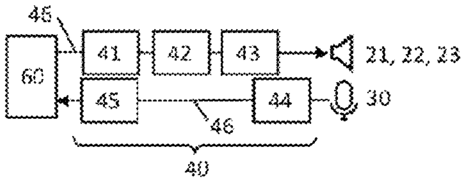
FIG. 10 shows a digital signal processor with connected sound electronics, shown schematically.

FIG. 10 shows a schematic diagram of the digital signal processor 60 with sound electronics 40 connected to it. This includes, for example, for each of the loudspeakers 21, 22, 23 used, a digital to analogue converter 41 of any type, possibly a preamplifier 42 and a power amplifier 43, while the microphone 30 is connected to a microphone amplifier 44 and to an analogue-digital converter 45, wherein leads 46 can be used for the connections. The converters 41, 45 are finally connected to the designated connections on the signal processor 60. Alternatively, the necessary sound electronics 40 can be integrated in the signal processor 60.

Only one loudspeaker 21, 22, 23 is shown in each case, but there can also be several loudspeakers 21, 22, 23 with the same functions, which are likewise connected to the necessary sound electronics 40.

With the device shown in FIG. 9 that is connected to the signal processor 60, the loudspeaker or loudspeakers 21, 22, 23 can output sound waves 24 into the room 10, which can be picked up by the microphone 30 and forwarded as a signal to the signal processor 60. In addition, room modes Ñ are formed in the room 10, one of which is shown schematically in a sinusoidal form in dashed lines. FIG. 9 shows two alternative preferred locations for the microphone 30, although only one microphone 30 is used, and only when characteristic value measurements are being carried out. While the method is being used with a user signal N, no microphone 30 is to be used. All that is needed is the signal processor 60 and one or two loudspeakers 21, 22, 23 connected to it with the required sound electronics 40.

In principle, the method can be carried out using the two options mentioned here. In the first variant, a main loudspeaker 21 and a separate correction loudspeaker 22 are provided; in the second, these are designed together as a common loudspeaker 23. The first variant is described in more detail in FIGS. 1-3 and 7, the second in FIGS. 4-6 and 8.

Figure 1:
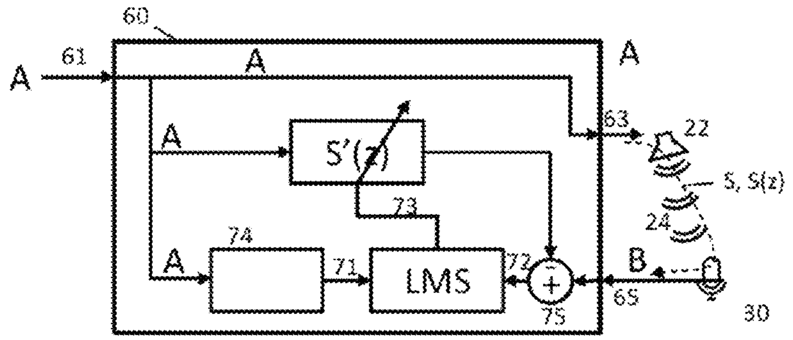
FIG. 1 shows a digital signal processor (DSP) to be used for a first characteristic value measurement when separate main and correction loudspeakers are used.
Figure 2:
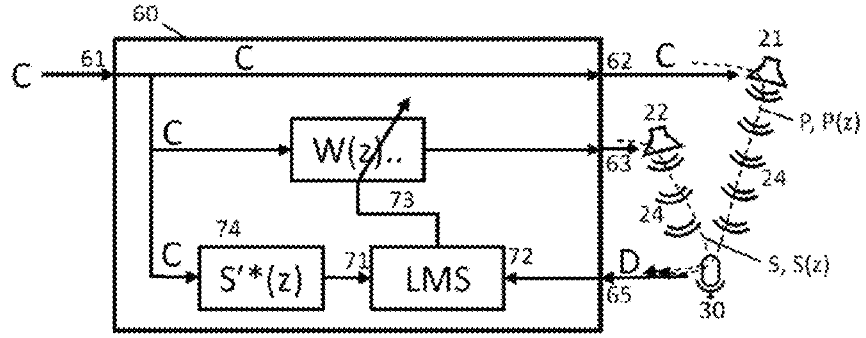
FIG. 2 shows a digital signal processor with its connections to be used for a second characteristic value measurement when separate main and correction loudspeakers are used.
Figure 3:
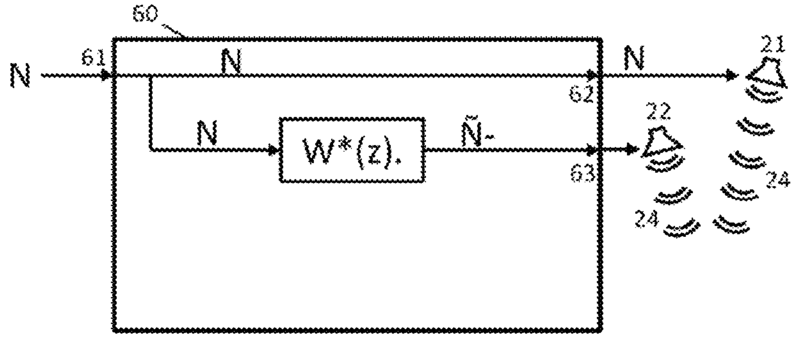
FIG. 3 shows a digital signal processor with its connections to be used for utilisation of the method with a user signal when separate main and correction loudspeakers are used.
Figure 4:
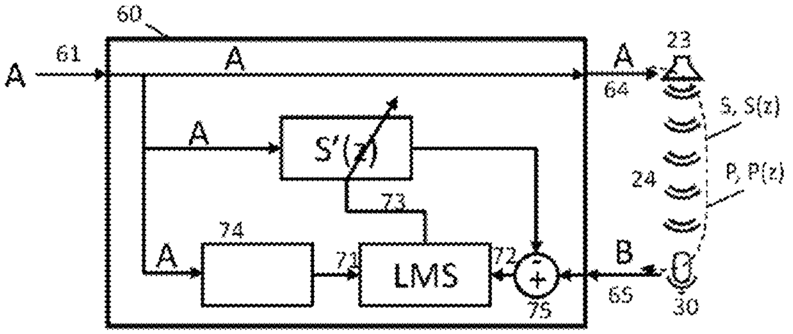
FIG. 4 shows a digital signal processor with its connections to be used for a first characteristic value measurement when a common loudspeaker is used.
Figure 6:
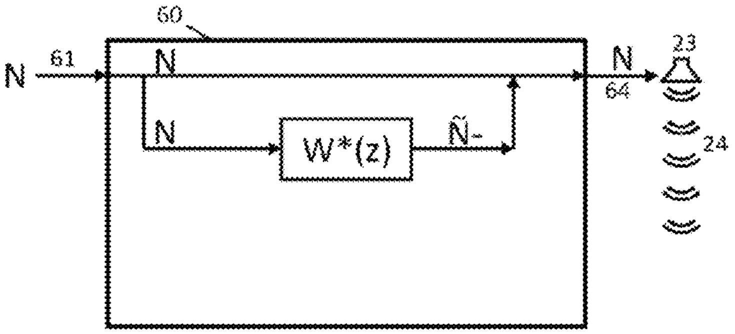
FIG. 6 shows a digital signal processor with its connections to be used for utilisation of the method with a user signal when a common loudspeaker is used.

The method according to the invention essentially comprises a first and a second characteristic value measurement, shown in FIGS. 1 and 2 for the first variant and in FIGS. 4 and 6 for the second variant, as well as the actual use with a user signal, shown in FIGS. 3 and 6.

Figure 7:
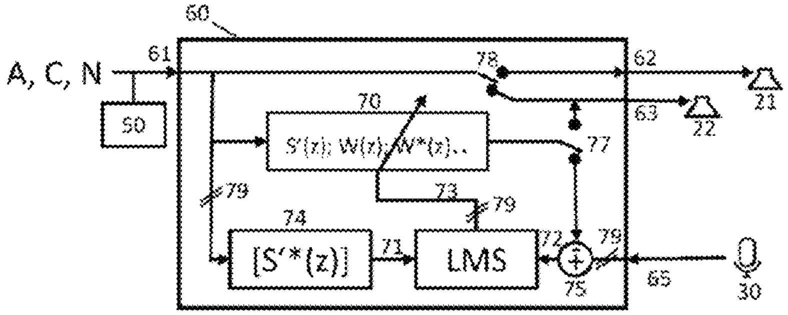
FIG. 7 shows a schematic diagram of a digital signal processor with its connections to be used in FIGS. 1 to 3 when separate main and correction loudspeakers are used.
Figure 8:
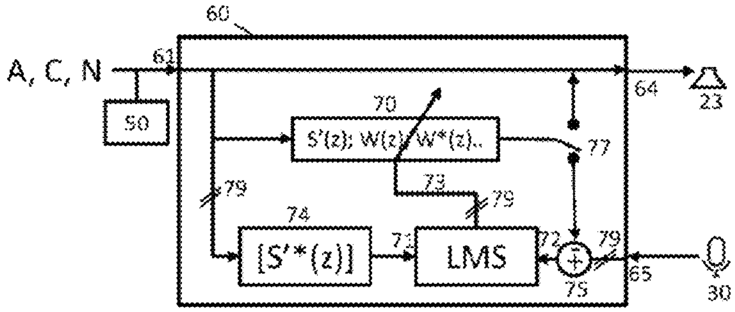
FIG. 8 shows a schematic diagram of a digital signal processor with its connections to be used in FIGS. 4 to 6 when a common loudspeaker is used.

FIGS. 7 and 8 show the two variants of the signal processor 60 as a circuit diagram, for carrying out all the steps of the method.

The invention is described in detail in the following:

The method according to the invention serves to eliminate room modes Ñ which form as resonances in a room 10 when a digital user signal N is played by a main loudspeaker 21. It is characterised by the following steps:

a. setting up and carrying out characteristic value measurements, by
    i. positioning a main loudspeaker 21 and a correction loudspeaker 22 in a room 10, for example in a sound studio, wherein these loudspeakers 21, 22 can be two separate loudspeakers or one common loudspeaker 23;
    positioning a microphone 30 in this room 10;
    providing a digital signal processor 60 with a signal input 61 for inputting and processing digital signals A, C, N, a first loudspeaker output 62 and a second loudspeaker output 63 for the main loudspeaker 21 and the correction loudspeaker 22, which can be combined to form a common loudspeaker output 64 for the common loudspeaker 23, and a microphone input 65 for the microphone 30, connection of the signal processor 60, the loudspeaker or loudspeakers 21, 22, 23 and the microphone 30 to sound electronics 40, for generating and detecting sound waves 24 by means of loudspeakers 21, 22, 23 and microphone 30;

ii. carrying out a first characteristic value measurement, in which a first transfer function S(z), which maps the change in a digital signal A after it has been recorded on the microphone 30 on a secondary path S which is played via the correction loudspeaker 22 or the common loudspeaker 23 as sound waves 24, and captured as a digital signal B [AS(z)=B], is reproduced by a changeable electronic filter S'(z), using an LMS(Least Mean Square) module to carry out a numerical gradient method, preferably using the filtered-x LMS method, which generates the changeable filter S'(z) based on the knowledge of the original signal A and adjusts it until the original signal A, after it has passed through this filter S'(z), corresponds to the detected signal B at the end of the secondary path S and cancels this out as far as possible at an electronic subtractor 75 [AS(z)−AS'(z)=0];

iii. saving this electronic filter S'*(z), which thus becomes unchangeable;

iv. carrying out a second characteristic value measurement, in which a second transfer function Pz, which maps the change in a digital signal C after it has been recorded on the microphone 30 on a primary path P which is played via the main loudspeaker 21 or the common loudspeaker 23 as sound waves 24, and captured as a digital signal D [CP(z)=D], is partially reproduced by a changeable electronic filter W(z), using the LMS module to carry out a numerical gradient method, preferably using the filtered-x LMS method, which generates the changeable filter W(z) based on the knowledge of the original signal C after it has passed through the stored filter S'*(z), and adjusts it until the original signal C, when it passes through this changeable filter W(z) and subsequently the secondary path S, corresponds to the negative of the originally detected signal D from the primary path P and minimises this accordingly when merging at the microphone 30 [CP(z)−CWS(z)≈0];

v. saving the electronic filter W*(z), which thus becomes unchangeable;

b. setting up and using the method with a user signal N, by i. positioning the main loudspeaker 21 and the correction loudspeaker 22, or the common loudspeaker 23, at the same locations in the same room 10 as for the characteristic value measurements, with the same sound electronics 40 required for that and connection to the digital signal processor 60 as in step a;

ii. routing the digital user signal N to the first or common output 62, 64 and playing it through the main loudspeaker or common loudspeaker 21, 23, wherein room modes Ñ are formed in the room 10;

iii. simultaneously routing this user signal N through the last saved filter W*(z) in the signal processor 60 and subsequently forwarding it to the second or common output 63, 64, and playing this filtered user signal (Ñ−) through the correction loudspeaker or common loudspeaker 22, 23 with a delay because of the time dt required by the filter W*(z), iv. through which the room modes Ñ of the digital user signal N that are still present in the room 10 after the time delay dt are eliminated.

For elucidation, accordingly first of all the room 10 is set up in step a. Care should be taken here to ensure that the loudspeaker or loudspeakers 21, 22, 23 always remain in the same place. The characteristic value measurements only need to be carried out once in each case. Any user signals N can then be played until the room geometry has changed in relation to the loudspeaker positions.

Thus if, for example, a room is divided or the loudspeaker position is changed, new characteristic value measurements are necessary. The position of the loudspeakers 21, 22, 23 should therefore be chosen carefully.

Since room modes Ñ are usually low frequency, it is advisable to use subwoofers as loudspeakers 21, 22, 23, as these are suitable for playing low frequency sounds.

In principle, the microphone 30 can be arranged at any location in the room 30. However, it has proven advantageous for the microphone 30 in step a to be positioned at a location either where a person 11 is likely to be in step b, or near a wall 13 of the room 10 that is far away from the main loudspeaker 21.

Figure 5:
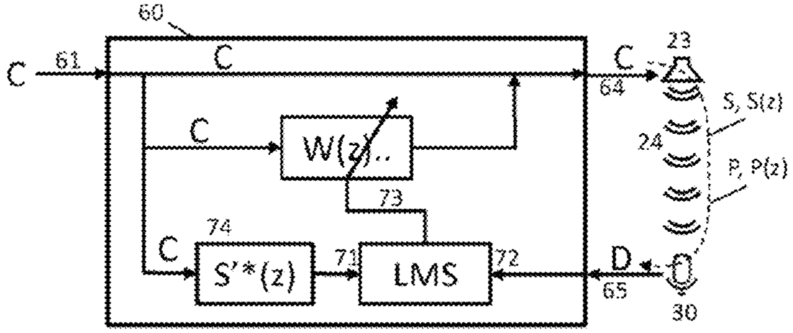
FIG. 5 shows a digital signal processor with its connections to be used for a second characteristic value measurement when a common loudspeaker is used.

The aim of the first characteristic value measurement, shown in FIGS. 1 and 4, is to determine and save the unchangeable electronic filter S'*(z) which is required for the second characteristic value measurement, shown in FIGS. 2 and 5. To do this, the changeable filter S'(z) is changed and adjusted by the LMS module until the signal that is output from the subtractor 75 [AS'(z)−B] via the second input 72 into the LMS module is minimal, preferably zero. As long as this is not the case, the LMS module continues to change the changeable filter S'(z). The original signal A which enters the LMS module via the first input 71 serves as a reference. The changeable filter S'(z) electronically maps the transfer function S(z) on the secondary path. This means that a signal A which passes through the filter S'(z) changes in the same way as the signal A which passes through the secondary path via loudspeakers 22, 23 and microphone 30, in the meantime as a sound wave 24. This change also includes all room-related distortions and room modes Ñ which spread in the room 10 and continue to resonate long after a pulse has been emitted.

The reproduction is adjusted with the aid of the LMS module and takes approximately between 10 and 30 seconds; then the determined changeable filter S'(z) can be saved as an unchangeable filter S'*(z). It is needed only for the second characteristic value measurement but is not used for the later usage phase. Any signal can be used as signal A that has a sufficient frequency content of all relevant low frequencies. White or, preferably, pink noise has proven to be useful.

Subsequently, the signal processor 60 can be set up for this second characteristic value measurement. The changeable filter W(z) is now at the location of the previous changeable filter S'(z). Its output leads to the second or common output 63, 64 and finally to the correction loudspeaker 22 or to the common loudspeaker 23, as shown in FIGS. 2 and 5. Alternatively, an additional signal processor 60 can be used which is set up for this second characteristic value measurement.

The aim of this second characteristic value measurement, shown in FIGS. 2 and 5, is to determine and save the unchangeable electronic filter W*(z) which is ultimately needed for use according to FIGS. 3 and 6. This second characteristic value measurement is completed when the signal D, which is routed from the microphone 30 to the LMS module, is cancelled out as far as possible.

It should be noted that through the use of the filter W(z), the signal D which is forwarded by the microphone 30 and which originates from the sound waves 24 from the primary path P, CP(z), is soon superimposed by the sound waves 24 from the secondary path S and is therefore modified. The best possible cancellation of the signal D is achieved when the sound waves caused by the correction loudspeaker 22 compensate as far as possible for those caused by the main loudspeaker 21. This in turn means that the signal C on the primary path P changes as similarly as possible to the way through the filter W(z) and subsequently via the secondary path S. Since this secondary path S is already known from the first characteristic value measurement in the form of S'*(z), the resulting filter W*(z) can be determined in the same way as S'*(z) was previously. White or, preferably, pink noise can again be used as the output signal C; the process takes a similar amount of time to the first characteristic value measurement.

However, the LMS module can only recognise and react to causal relationships in the signals from its two inputs 71, 72. It changes the electronic filter W(z) in such a way that there are no longer any components in the signal D that have a causal relationship with the signal from the filter position 74. Accordingly, for example, ambient noise that only enters the LMS module via the input 72 is irrelevant and has no influence on the characteristic value measurement or on changing the electronic filter W(z).

The passage of the signal C through the electronic filter W(z) takes a certain amount of time dt. The signal in the secondary path S is therefore emitted correspondingly later by the correction loudspeaker 22, 23 than in the primary path P by the main loudspeaker 21, 23. Thus, the signal in the secondary path S cannot eliminate the original signal C in the primary path P because it is too late. The room modes Ñ, on the other hand, continue to oscillate for a long time in the room 10, and spread there. They have a causal connection with the original signal that caused them and can therefore be eliminated by the correction loudspeaker 22, 23.

The signal C needs a time dt to pass through the filter W(z) and also a time dts to pass through the secondary path, with dt being much shorter than $dt_s$ under normal conditions. In addition, the signal C needs the time $dt_p$ to pass through the primary path. The arrangement of the loudspeakers in FIGS. 2 and 3 is not representative; the two path lengths of the sound waves 24 to the microphone 30 can be the same or different. The loudspeakers 21, 22 would be placed next to each other in most cases. As a rule, however, care should be taken to place the loudspeakers 21, 22 in the room 10 in such a way that for the times $dt+dt_s>dt_p$, so that the original sound cannot be cancelled out at the location of the microphone 30 too. This happens if the correction loudspeaker 22 and the location of the microphone 30 are very close to each other and the main loudspeaker 21 is very far away. However, this can also lead to good results. If the microphone 30 together with the correction loudspeaker 22 are arranged, for example, close to the wall 13 that is furthest away from the main loudspeaker 21, the entire useful signal N is cancelled out there, but only there. This creates room acoustics that suggest that this rear wall is missing. All of this is of significance only if the correction loudspeaker 22 and the main loudspeaker 21 are separate loudspeakers.

It should be noted that none of the times dt, $dt_s$ or $dt_p$ are determined or known. They are therefore not included in the method. The time delay dt of the delayed playback of the correction loudspeaker 22 corresponds to the time that the user signal N needs to pass through the filter W*(z). This value is determined solely by the filter W*(z). There is also no need to enter a delay in the system or in the process in order to intentionally send the signal Ñ− into the secondary path S later.

Preferably, a common loudspeaker 23 is used, to which the two signals N, Ñ− which were provided individually for the main loudspeaker 21 and the correction loudspeaker 22 are fed in a superimposed manner. This is certainly advantageous for cost reasons. In this case, the digital signal processor 60 can be arranged directly in the common loudspeaker 23, preferably integrated.

However, if a loudspeaker is already present that is to continue to be used, an additional correction loudspeaker 22 can be used. This is preferably a subwoofer, which preferably has similar acoustic properties to the existing loudspeaker since it hardly needs to play any high frequencies. The digital signal processor 60 and possibly other components of the sound electronics 40 can then likewise be arranged, preferably integrated, in this additional correction loudspeaker 22.

A microphone 30 is no longer required for using the method. This is preferably now detached and removed. The loudspeaker or loudspeakers 21, 22, 23 must however remain in their places and for utilisation too they are connected to the signal processor 60 with the sound electronics 40 required for this. Equivalent products should be used for the sound electronics 40 as for the characteristic value measurements, with characteristics as similar as possible.

In this phase of the method, only the components of the signal processor 60 are used, as shown in FIGS. 3 and 6. Accordingly, only the filter W*(z) is used which is situated upstream of the second or common output 63 or 64. The leads to the other components in the signal processor 60, in particular to and from the LMS module, can therefore be interrupted.

When used in the signal processor 60, a user signal N is simultaneously routed on the one hand to the first or common output 62, 64 and on the other hand through the filter W*(z), and subsequently as signal Ñ− to the second or common output 63, 64. Accordingly, the signal N from the main or common loudspeaker 21, 23 is played somewhat earlier than the signal Ñ− from the correction or common loudspeaker 22, 23, namely by the time dt which is needed for passing through the filter W*(z).

During this time dt, room modes N form in the room 10, which are eliminated by the correction loudspeaker 22 played with a delay. The original signal remains completely audible here.

The method does not delete sounds that originate from sources other than the digital user signal. The filter W*(z) can react to and neutralise only those sound waves that have a causal connection with the original signal and that are still present after the user signal N has passed through the filter.

Only those acoustic sound waves are deleted that have a causal connection with the user signal N and are still present in the room 10 after the time delay dt. These are the room modes Ñ.

In the following, the digital signal processor 60 according to the invention is described here with the aid of FIGS. 7 and 8. These show the two variants of the signal processor 60 as a circuit diagram for carrying out all method steps.

A digital signal processor 60 according to the invention for use in a method described above comprises:

- a digital signal input 61 for feeding in a digital output signal A, C or digital user signal N,
- either a first and a second output 62, 63 for connecting a main loudspeaker and a correction loudspeaker 21, 22, or a common output 64 for connecting a common loudspeaker 23,
- a microphone input 65 to which a microphone 30 can be connected for the characteristic value measurements,
- an LMS module for executing algorithms with two inputs 71, 72 and a control output 73 for carrying out the characteristic value measurements, wherein its first input 71 is connected to the digital signal input 61 and its second input 72 is connected to the microphone input 65,
- wherein arranged before the first input 71 of the LMS module is at least one filter position 74 which can be empty during the first characteristic value measurement and can be occupied by an unchangeable filter S'z during the second characteristic value measurement,
- a filter position 70 for a changeable filter S'(z), W(z) that can be changed during the characteristic value measurements by the control output 73 of the LMS module, and in which an unchangeable electronic filter W*(z) can be saved after completion of the second characteristic value measurement, wherein at the input side the filter position 70 is connected to the digital signal input 61, and at the output side it can be switched over by means of a first switch 77, so that at the output side, for the first characteristic value measurement it can be routed together with the microphone input 65 to a subtractor 75 and subsequently to the second input 72 of the LMS module, and for the second characteristic value measurement and for the use of the method in step b it can be connected to the second or common loudspeaker output 63, 64,
- as well as a connection from the digital signal input 61, which leads either to a second switch 78 which can optionally establish a connection to the first or second output 62, 63, or to the common output 64, so that the connection to the second or common output 63, 64 can be ensured for the first characteristic value measurement, and the connection to the first or common output 62, 64 can be ensured for the second characteristic value measurement and for the use of the method.

Other, modified signal circuit diagrams are also suitable if they can be used to carry out the methods according to the invention.

FIG. 7 shows the variant of the digital signal processor 60 with the first and second outputs 62, 63 for use with two separate main and correction loudspeakers 21, 22, while FIG. 8 shows the variant with the common output 64 for the common loudspeaker 23. Otherwise, the two versions are largely the same with few differences.

With these two variants of the signal processor 60 shown here, both the characteristic value measurements and the use of the method can be carried out. For this purpose, a first switch 77 is arranged, and in the variant according to FIG. 7, also a second switch 78. With these, the signal processor 60 can be configured for any use.

The first switch 77 is arranged at the output of the filter 70, which can be occupied with S'(z), W(z) or W*(z), and can lead optionally to the subtractor 75 or to the second or common output 63, 64. For the first characteristic value measurement, the first switch 77 is connected to the subtractor 75 so that the signal from the output of the filter 70 is subtracted from the microphone signal B which is received at the microphone input 65. After that, for the second characteristic value measurement, and for using the method, the first switch 77 will lead the signal from the filter 70 to the second or common output 63, 64.

In the second characteristic value measurement, the subtractor 75 does not receive a second signal for subtraction and accordingly passes the signal D unchanged to the LMS module. As is known, no microphone is used when using the method. An interrupter 79 can therefore be provided after the microphone input 65 in order to avoid interference.

Additional interrupters 79 can be arranged before or after the filter position 74 and/or at the control output 73 of the LMS module. They can all interrupt the lines during use of the method. However, they must ensure a connection during the characteristic value measurements. The interrupters 79 are optional and can also be omitted.

A further switch 78, see FIG. 7, is necessary only if the signal processor has a first and a second output 62, 63. This switch 78 can route a signal A, C, N from the signal input 61 to either the first or the second output 62, 63. For the first characteristic value measurement, the second switch 78 is connected to the second output 63, so that the signal A can be routed to the correction loudspeaker 22, to determine its characteristics. After that, for the second characteristic value measurement and for using the method, the switch 78 is connected to the first output 62. In the second characteristic value measurement, the signal C is routed to the second output 63, or when using the method, the user signal N is routed there.

As already described, interrupters 79 can also be arranged here which can interrupt the connections to and from the LMS module. If these are not arranged, the LMS module must be prevented in another way from exerting an influence on the unchangeable filter W*(z).

In summary, after the first characteristic value measurement, switch 77 and, if necessary, switch 78 must be switched over, and after the second characteristic value measurement, the microphone can be removed and the LMS module with the upstream filter position 74 can be uncoupled.

As soon as the room or the position of the loudspeakers 21, 22, 23 are changed, the first and second characteristic value measurements can be carried out again. To do this, the switches 77, 78 must be set accordingly again and the LMS module with the upstream filter position 74 must be connected. In addition, the microphone 30 must be set up and connected again.

In a preferred embodiment, the signal processor may comprise a sound generator 50 for performing the characteristic value measurements, wherein the sound generator can preferably generate white or pink noise.

According to the invention, a loudspeaker 21, 22, 23 is also described here which comprises a digital signal processor 60 according to the invention, wherein it is preferably a subwoofer.

This loudspeaker is preferably the correction loudspeaker 22 or the common loudspeaker 23.

REFERENCE KEY

- 10 Room, for example a recording studio
- 11 Seat for a person, a person
- 12 Additional loudspeakers, optional
- 13 Wall of the room
- 21 Main loudspeaker
- 22 Correction loudspeaker

23 Common loudspeaker
24 Sound waves
30 Microphone, location of microphone
40 Sound electronics, general
41 Digital to analogue converter
42 Preamplifier
43 Power amplifier
44 Microphone amplifier
45 Analogue to digital converter
46 Cable
50 Sound generator
60 Digital signal processor
61 Signal input for a digital signal
62 First output for the main loudspeaker
63 Second output for the correction loudspeaker
64 Output for the common loudspeaker
65 Microphone input
70 Filter position, for changeable or unchangeable filter
71 First input to the LMS module
72 Second input to the LMS module
73 Control output from LMS module to changeable filter
74 Filter position
75 Subtractor for subtraction when two signals are merged
77 First switch
78 Second switch
79 Interrupter for temporary disconnection, optional
A Digital output signal, for the first characteristic value measurement
B Digital end signal, for the first characteristic value measurement
C Digital output signal, for the second characteristic value measurement D Digital end signal, for the second characteristic value measurement
N Digital user signal for the utilisation of the method
Ñ– Filtered user signal, for eliminating the room modes
Ñ Room mode which is created due to sound waves emitted in the room
LMS LMS module for carrying out numerical gradient methods
S Secondary path
S(z) First transfer function on the secondary path
S'(z) Electronic filter, changeable and saveable
S'*(z) Stored electronic filter S'(z), unchangeable
P Primary path
P(z) Second transfer function on the primary path
W(z) Electronic filter, changeable and saveable
W*(z) Saved electronic filter W(z), unchangeable
dt Time delay in the electronic filter W(z)
$dt_p$ Transit time of the sound wave in the primary path P
$dt_s$ Transit time of the sound wave in the secondary path S

The invention claimed is:

1. A method for eliminating room modes (Ñ) which form as resonances in a room when a digital user signal (N) is played by a main loudspeaker, characterised by the following steps:

a. setting up and carrying out characteristic value measurements, by
   i. positioning a main loudspeaker and a correction loudspeaker in a room, wherein these loudspeakers can be two separate loudspeakers or one common loudspeaker;
   positioning a microphone in this room;
   providing a digital signal processor with a signal input for inputting and processing digital signals (A, C, N), a first loudspeaker output and a second loudspeaker output for the main loudspeaker and the correction loudspeaker, which can be combined to form a common loudspeaker output for the common loudspeaker, and a microphone input for the microphone,
   connection of the signal processor, the loudspeaker or loudspeakers and the microphone to sound electronics;
   ii. carrying out a first characteristic value measurement, in which a first transfer function (S (z)), which maps the change in a digital signal (A) after it has been recorded on the microphone on a secondary path(S) which is played via the correction loudspeaker or the common loudspeaker as sound waves, and captured as a digital signal [AS(z)=B], is reproduced by a changeable electronic filter (S'(z)),
   using an LMS (Least Mean Square) module to carry out a numerical gradient method;
   iii. saving this electronic filter (S'*(z)), which thus becomes unchangeable;
   iv. carrying out a second characteristic value measurement, in which a second transfer function (P (z)), which maps the change in a digital signal C after it has been recorded on the microphone on a primary path (P) which is played via the main loudspeaker or the common loudspeaker as sound waves and captured as a digital signal (D) [CP(z)=D], is partially reproduced by a changeable electronic filter (W(z)),
   using the LMS module to carry out a numeric gradient method;
   v. saving the electronic filter (W*(z)), which thus becomes unchangeable;

b. setting up and using the method with a user signal (N), by
   i. positioning the main loudspeaker and the correction loudspeaker, or the common loudspeaker, at the same locations in the same room as for the characteristic value measurements, with the same sound electronics required for that and connection to the digital signal processor as in step a;
   ii. routing the digital user signal (N) to the first or common output and playing it through the main loudspeaker or common loudspeaker, wherein room modes (Ñ) are formed in the room;
   iii. simultaneously routing this user signal (N) through the last saved filter (W*(z)) in the signal processor and subsequently forwarding it to the second or common output, and
   playing this filtered user signal (Ñ–) through the correction loudspeaker or common loudspeaker with a delay on account of the time (dt) required by the filter (W*(z)),
   iv. through which the room modes (Ñ) of the digital user signal (N) that are still present in the room after the time delay (dt) are eliminated.

2. The method according to claim 1, characterised in that before step a.iv), the digital signal processor is set up for the second characteristic value measurement, in that the output of the changeable filter (W(z)) is routed to the second or common output to the correction loudspeaker or to the common loudspeaker.

3. The method according to claim 1, characterised in that the microphone is positioned in step a at a place at which a person is envisaged to be in step b, or close to a wall of the room that is far away from the main loudspeaker or the common loudspeaker.

4. The method according to claim 1, characterised in that the room is between 10 and 100 $m^2$ in size.

5. The method according to claim 1, characterised in that the time delay (dt) of the delayed playback of the correction loudspeaker corresponds to the time that the user signal (N) requires for passing through the filter W*(z).

6. The method according to claim 1, characterised in that the main loudspeaker and the correction loudspeaker are separate loudspeakers.

7. The method according to claim 6, characterised in that in step a, the correction loudspeaker is positioned at a location in the room such that a sound wave that is emitted by the main loudspeaker arrives at the microphone earlier than a sound wave that is emitted later, with the time delay (dt), by the correction loudspeaker.

8. The method according to claim 1, characterised in that a common loudspeaker is used, to which those two signals which were individually intended for the main loudspeaker and the correction loudspeaker are supplied in a superimposed manner.

9. The method according to claim 1, characterised in that in step b, no microphone is used, wherein the microphone is preferably disconnected before step b of the method.

10. The method according to claim 1, characterised in that the main loudspeaker and/or the correction loudspeaker or, if applicable, the common loudspeaker are subwoofers.

11. The method according to claim 1, characterized in that the numerical gradient method is a filtered-x LMS algorithm.

12. A digital signal processor for use in a method according to claim 1, comprising a digital signal input for feeding in a digital output signal (A, C) or digital user signal (N), either a first and a second output for connecting a main loudspeaker and a correction loudspeaker, or a common output for connecting a common loudspeaker, a microphone input to which a microphone can be connected for the characteristic value measurements, an LMS module for executing algorithms with two inputs and a control output for carrying out the characteristic value measurements, wherein its first input is connected to the digital signal input and its second input is connected to the microphone input, wherein arranged before the first input of the LMS module is a filter position which is empty during the first characteristic value measurement and can be occupied by an unchangeable filter (S'*(z)) during the second characteristic value measurement, a filter position for a changeable filter (S'(z), W(z)) that can be changed during the characteristic value measurements by the control output of the LMS module, and in which an unchangeable electronic filter (W*(z)) can be saved after the completion of the second characteristic value measurement, wherein at the input side the filter position is connected to the digital signal input, and at the output side it can be switched over by means of a first switch, so that at the output side, for the first characteristic value measurement it can be routed together with the microphone input to a subtractor and subsequently to the second input of the LMS module, and for the second characteristic value measurement as well as for the use of the method in step b it can be connected to the second or common loudspeaker output, as well as a connection from the digital signal input, which leads either to a second switch which can optionally establish a connection to the first or second output, or to the common output, so that the connection to the second or common output can be ensured for the first characteristic value measurement, and the connection to the first or common output can be ensured for the second characteristic value measurement as well as for the use of the method.

13. The digital signal processor according to claim 12, characterised in that one or more interrupters are arranged which, for utilisation of the method after the characteristic value measurements have been completed, can interrupt the connection to the first and/or second input of the LMS module and/or the control connection from the LMS module to the filter position.

14. The digital signal processor according to claim 12, characterised in that it comprises a sound generator for carrying out the characteristic value measurements, wherein the sound generator can preferably generate pink noise.

15. A loudspeaker system comprising one or more loudspeakers and a digital signal processor according to claim 12.

16. The loudspeaker system according to claim 15, wherein the one or more loudspeakers comprises a correction loudspeaker and main loudspeaker, or a common loudspeaker.

17. The loudspeaker system according to claim 15, wherein the one or more loudspeakers comprises a subwoofer.

18. The method according to claim 1, wherein connection of the signal processor, the loudspeaker or loudspeakers and the microphone to sound electronics comprises, in each case, at least one digital to analogue converter, power amplifier, microphone amplifier, analogue to digital converter and cable, for generating and detecting sound waves by means of the loudspeaker or loudspeakers and the microphone.

19. The method according to claim 1, wherein, when carrying out the first characteristic value measurement, using the LMS module to carry out a numerical gradient method, uses a filtered-x LMS method, which generates the changeable filter (S'(z)) based on the knowledge of the original signal (A) and adjusts it until the original signal (A), after it has passed through this filter (S'(z)), corresponds to the detected signal (B) at the end of the secondary path(S) and cancels this out as far as possible at an electronic subtractor [AS(z)−AS'(z)~0].

20. The method according to claim 1, wherein, when carrying out the second characteristic value measurement, using the LMS module to carry out a numeric gradient method preferably using the filtered-x LMS method, which generates the changeable filter (W(z)) based on knowledge of the original signal (C) after it has passed through the stored filter (S'*(z)) and adjusts it until the original signal (C), when it passes through this changeable filter (W(z)) and subsequently the secondary path(S), corresponds as far as possible to the negative of the originally detected signal (D) from the primary path P and minimises this accordingly when merging at the microphone [CP (z)−CWS(z)~0].

21. The method according to claim 1, wherein the room is a sound studio.

* * * * *